(12) United States Patent
Schulken

(10) Patent No.: US 7,819,433 B2
(45) Date of Patent: Oct. 26, 2010

(54) LETTER GUIDE SHEET

(75) Inventor: Toni M. Schulken, Charlotte, NC (US)

(73) Assignee: MeadWestvaco Corporation, Richmond, VA (US)

( * ) Notice: Subject to any disclaimer, the term of this patent is extended or adjusted under 35 U.S.C. 154(b) by 334 days.

(21) Appl. No.: 11/853,411

(22) Filed: Sep. 11, 2007

(65) Prior Publication Data

US 2009/0066074 A1   Mar. 12, 2009

(51) Int. Cl.
G09B 11/00   (2006.01)

(52) U.S. Cl. .............................. 283/45; 283/46; 434/162

(58) Field of Classification Search ................ 434/162, 434/163, 164, 165, 167; 283/44–46, 61, 283/62, 63.1, 117, 115; 281/15.1, 2, 3.1, 281/5, 38, 51
See application file for complete search history.

(56) References Cited

U.S. PATENT DOCUMENTS

| | | | | |
|---|---|---|---|---|
| 1,753,344 | A * | 4/1930 | Knecht | .......................... 434/85 |
| 3,731,402 | A | 5/1973 | Paul | |
| 4,173,082 | A * | 11/1979 | Niquette | ..................... 434/162 |
| 4,669,986 | A * | 6/1987 | Yokoyama | .................. 434/164 |
| 5,102,338 | A | 4/1992 | Kapiloff | |
| 5,409,381 | A * | 4/1995 | Sundberg et al. | ............ 434/165 |
| 5,984,368 | A * | 11/1999 | Cain | .......................... 283/115 |
| 6,142,783 | A * | 11/2000 | Rocha | ........................ 434/164 |
| 6,215,901 | B1 * | 4/2001 | Schwartz | .................... 382/186 |
| 6,302,696 | B1 | 10/2001 | O'Neill | |
| 6,579,100 | B1 | 6/2003 | Clark et al. | |
| 2006/0084040 | A1 | 4/2006 | Schulken | |
| 2006/0121424 | A1 | 6/2006 | Ford et al. | |
| 2006/0188853 | A1 * | 8/2006 | Mismas, Jr. | ................. 434/162 |
| 2008/0131852 | A1 * | 6/2008 | Van Hofwegen | ............ 434/165 |
| 2009/0068626 | A1 * | 3/2009 | Schulken | ..................... 434/162 |

FOREIGN PATENT DOCUMENTS

| | | |
|---|---|---|
| CA | 2311948 | 12/2000 |
| WO | WO/2003/067557 | 8/2003 |
| WO | WO/2004/107292 | 9/2004 |

OTHER PUBLICATIONS

*Smart Start Paper*, Frog Street Press, Crandall, TX, http:www.fsp3.com/scripts/CategoryList.asp?Category=H1 (Oct. 28, 2003).
*Handwriting Without Tears*, Jan Olsen, Cabin John, MD, http://shopping.hwtears.com/product/Letters_and_Number_for_Me-rediness (Jun. 15, 2006).
*Build A Doodle Ocean, Step-by-Step Line Drawings To Improve Visual Perception*, The Learning Works, Inc., Santa Barbara, CA (1985).

* cited by examiner

*Primary Examiner*—Dana Ross
*Assistant Examiner*—Pradeep C Battula
(74) *Attorney, Agent, or Firm*—MWV Intellectual Property Group

(57) ABSTRACT

A sheet assembly including a sheet and sequential instruction indicia on the sheet. The sequential instruction indicia includes discrete ordered steps that cue a user in proper writing strokes to write an associated letter or number. The sheet assembly further includes narrative indicia on the sheet having discrete portions that correspond to the discrete ordered steps of the sequential instruction indicia.

21 Claims, 8 Drawing Sheets

LFEH

Stick Kids stand up straight.
Some Stick Kids wear hats, too.

See Stick Kids with their belts,
And the others wearing shoes.

| ─ O + / □ \ X △

FIG. 9        31

LETTER GUIDE SHEET

The present invention is directed to a sheet for developing a user's writing skills, and more particularly, to a sheet for developing a user's letter or number writing skills.

BACKGROUND

As children and other users learn to write letter and numbers, it is important to teach the proper form of the letter or numbers, as well as proper stroke direction (i.e. directionality of letter and number formation). Moreover, users should be taught continuity of letter and number formation which results in increased legibility and leads to an easier transition to cursive writing.

SUMMARY

In one embodiment the invention is a sheet assembly including a sheet and sequential instruction indicia on the sheet. The sequential instruction indicia includes discrete ordered steps that cue a user in proper writing strokes to write an associated letter or number. The sheet assembly further includes narrative indicia on the sheet having discrete portions that correspond to the discrete ordered steps of the sequential instruction indicia.

BRIEF DESCRIPTION OF THE DRAWINGS

FIG. 9 illustrates the nine pre-writing shapes.

DETAILED DESCRIPTION

Figure 1:
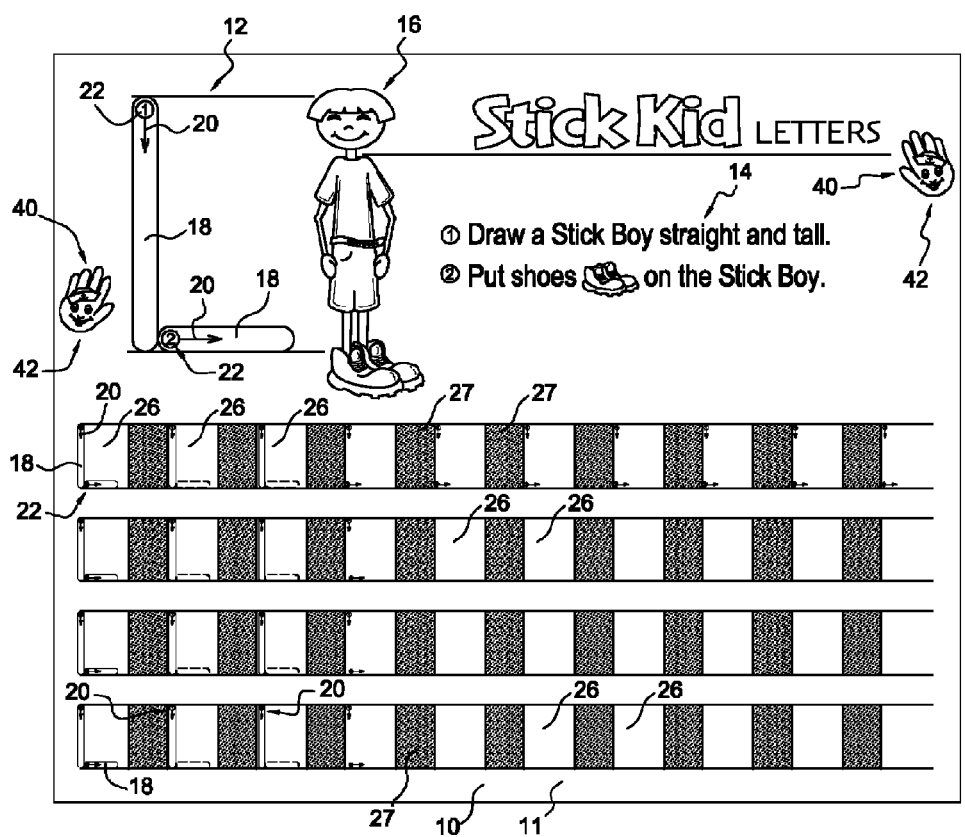
FIG. 1 illustrates an instruction sheet teaching a user how to write the letter "L"

As shown in FIG. 1, an instruction sheet 10 of the present invention may include sequential instruction indicia 12, narrative text or indicia 14, and a pictorial representation 16 printed thereon. The sheets 10 may include or take the form of a sheet-like material 11 which can be made of from any of a wide variety of materials. However, the sheets 10/sheet-like material 11 will typically be made of a cellulose-based or pulp-based paper such that the sheets 10/sheet-like material 11 are generally water absorbent and can be written upon by a wide variety of media (i.e. pens, pencils, markers, crayons, etc.) However, the sheets 10/sheet-like material 11 can be made of any of a relatively wide variety of materials, and need not necessarily be of a water-absorbent material (i.e. could be a write-on/wipe off (polymer) material that can be re-used, etc.) The instruction sheets 10/sheet-like material 11 may be relatively thin, and may have a thickness of about 0.5 mm or less.

The sequential instruction indicia 12 instructs a user in how to properly write/draw a letter or number, such as an uppercase/capital letter of the English alphabet (the letter "L" in the embodiment of FIG. 1). The sequential instruction indicia 12 may include a traceable version 18 of the letter or number. The traceable version 18 may be presented as a relatively thin or light line, a shaded line, a non-black line and/or an incomplete line which is printed in dotted or dashed format. The traceable version 18 may be formatted in this manner so that a user can write over the traceable version 18 and easily distinguish which portions of the traceable version 18 are pre-printed, and which portions have been written by the user. The sequential instruction indicia 12 may also includes arrows 20 or other directional cues and associated numerical cues 22. The arrows 20 and numerical cues 22 may be superimposed on the traceable version 18, or could be placed adjacent to the traceable version 18.

The arrows 20 and numerical cues 22 form discrete ordered steps that teach or cue a user in the proper writing strokes to write the associated letter or number. The ordered steps thereby encourage a user to learn proper directional sequence for letter or number writing (i.e. in general, when forming letters or numbers always drawing vertical lines in a top-to-bottom direction; drawing horizontal lines in a left-to-right direction; drawing curves/circles in a top-to-left (i.e. counter-clockwise from the top) direction; and using continuous strokes).

In the illustrated embodiment, each guide arrow 20 is numbered with the numerical indicia 22. Moreover, the arrow 20, or the associated portion of the traceable version 18, is colored. For example, in FIG. 1 the vertical portion of the traceable version 18 of the letter "L" (which corresponds, and is located adjacent to, arrow "1") is red, and the horizontal portion of the traceable version 18 of the letter "L" (which corresponds to, and is located adjacent to arrow "2") is green.

The narrative text 14 provides text that reinforces the cues provided by the sequential instruction indicia 12. The narrative text 14 may include discrete portions that correspond to each discrete ordered step of the sequential instruction indicia 12. For example, in FIG. 1 the narrative text 14 includes the text "Draw a Stick Boy straight and tall" next to the number "1." This text obviously implies/instructs a user to draw a vertical line, and therefore corresponds to, and reinforces, step 1 of the instruction indicia 12 (the drawing of vertical line). Thus, each step of the narrative text 14 may describe an object or activity that is symbolic of the associated step of the instruction indicia 12. There may be a one-to-one correspondence between the steps of the narrative text 14 and the steps of the instruction indicia 12.

The narrative text 14 can further be linked to the associated step of the instruction indicia 12 by other means, such as color. For example, the number "1" of the narrative text 14, or the narrative text itself, or surrounding portions, can be printed with a color corresponding to the color of the corresponding part of the instruction indicia 12. Thus, continuing with the example above, the instruction number "1" of the narrative text 14 (or the narrative text itself) is printed in red.

Step "2" of the narrative text 14, "Put shoes on the Stick Boy" implies a horizontal structure thereby supporting the associated horizontal line drawing step "2" of the instruction indicia 12. Moreover, the number "2" of the narrative text 14 may also be printed in green, which corresponds in color to the number "2" of the instruction indicia 12 and the horizontal line of the traceable letter "L."

Moreover, besides color coding, various other patterns, indicia or the like may be utilized to associate the instruction indicia 12 and the narrative text 14. The use of patterns, indicia or the like to provide the connection can be useful in cases where color printing is not desired or practicable, or to accommodate users with color blindness.

The narrative 14 text may describe the creation of a non-letter (and non-number) object, or may describe activity that generally corresponds to the letter or number. For example, in the embodiment of FIG. 1, the non-letter object is a "Stick Kid" having a vertically oriented torso and horizontally-oriented feet/shoes that collectively generally corresponds to the letter "L." In the embodiment of FIG. 2, the non-letter object is a "Stick Girl" having a vertically oriented torso, horizontally-oriented feet/shoes, a horizontally-oriented belt and a horizontally-oriented hat collectively corresponding generally to the letter "E." Each instruction sheet 10 may include the pictorial representation 16 of the non-letter object printed thereon to further reinforce the narrative text 14 and instruction indicia 12. Moreover, rather than strictly using text, other indicia, such as drawings, picture, diagrams or the like may be utilized to provide the narrative in the narrative portion 14.

The narrative text 14, along with the pictorial representation 16, provides a "story" which is easy for the user to learn and remember, as opposed to having to rely upon rote memorization to learn the shapes and line stroke order of each letter or number. For example, when writing the letter "L" the user need only remember the "Stick Kid" and the shape, strokes, and order can all be easily and naturally recalled. This multi-sensory approach to teaching letter formation utilizes color and other visual, and non-visual, cues. For example, the stories/narratives may be read to the user by a parent, teacher, or the like, which allows a user to audibly receive letter formation instructions. The narrative text 14 may also include action words that help the user visualize the movement necessary to form the letters, and the action words may be based on familiar childhood play experiences (i.e. sliding down a pole and jumping back to the top; see instruction sheet 10 of FIG. 5).

In the illustrated embodiment, each differing stroke of the traceable version 18 of the letter or number is written in a differing color (or pattern, etc.) Thus a user knows that when there is a change in color, a new writing stroke is presented and the user should pick up his writing instrument from the sheet for placement at a new location to start the next writing stroke. Conversely, when there is no change in color, the user is cued to keep their writing instrument on the sheet 10, thereby reinforcing letter continuity.

Once the user has written/traced the letter or number on the instruction indicia 12 as guided by the narrative text 14, the user can utilize various block/writing spaces 26 provided on the sheet 10 to repeat of the lessons taught by the instruction indicia 12 and narrative text 14. Each horizontal row of blocks 26 may begin with a traceable version 18 of the letter or number. Directional cues 20 and associated numbers 22 may be provided. Subsequent blocks 26 (in a left-to-right progression) may include a lighter or partial version of the traceable version 18. Even more subsequent blocks 26 may omit the traceable version 18, leaving only the directional cues 20 and numbers 22. Finally, the directional cues numbers 22 may be omitted to provide blank writing spaces to allow the user to write each letter or number without any direct guidance. In this manner, as a user works left-to-right across a row, the user receives progressively less instructions to allow a user to learn how to write each letter or number without direct guidance. In addition, each row provides numerous opportunities for a user to write each letter or number and learn by repetition. Moreover, each row of blocks 26 may have spacers 27 to teach a user proper spacing of the written letters/numbers.

The instruction indicia 12 and each block 26 may each be printed on/filled with a fill color, such as yellow. The yellow color attracts the user's attention, and provides less glare than white paper which decreases visual fatigue. This can be particularly useful for children who are not used to visually focusing on close work (i.e. paper and pencil tasks) for long periods of time. A yellow fill color is also easy to write upon and provides sufficient contrast with pencils and other writing instruments. However, various other fill colors besides yellow, such as rose, light blue or the like may be utilized.

Figure 2:
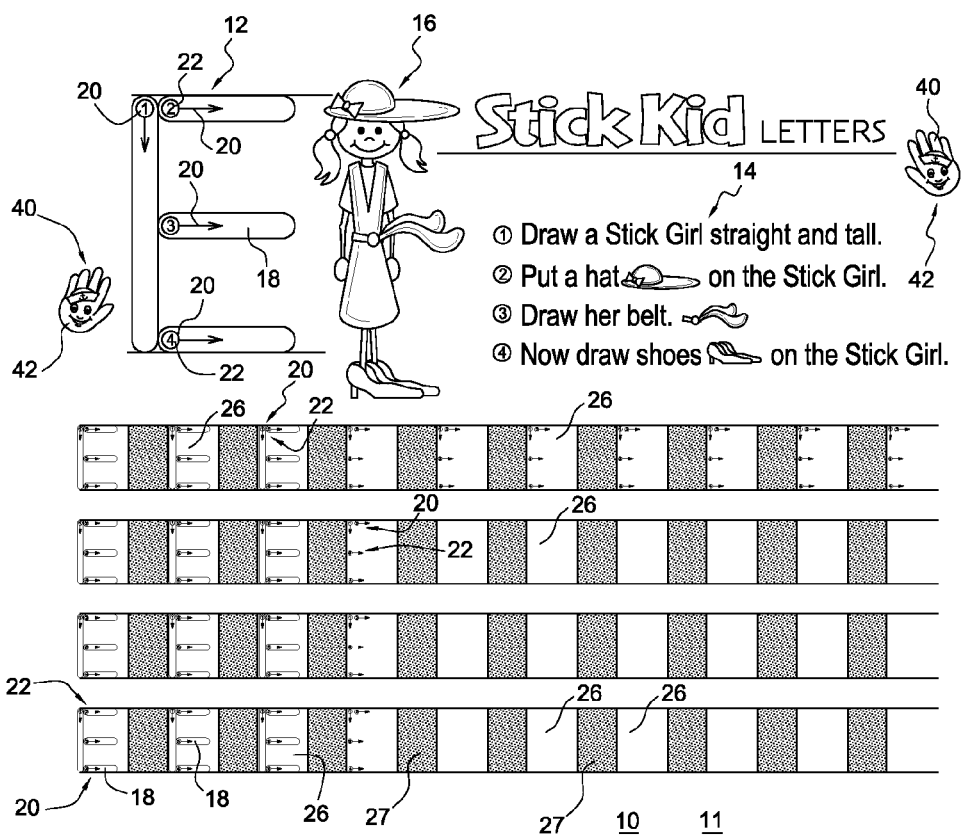
FIG. 2 is an instruction sheet teaching a user how to write the letter "E"
Figure 5:
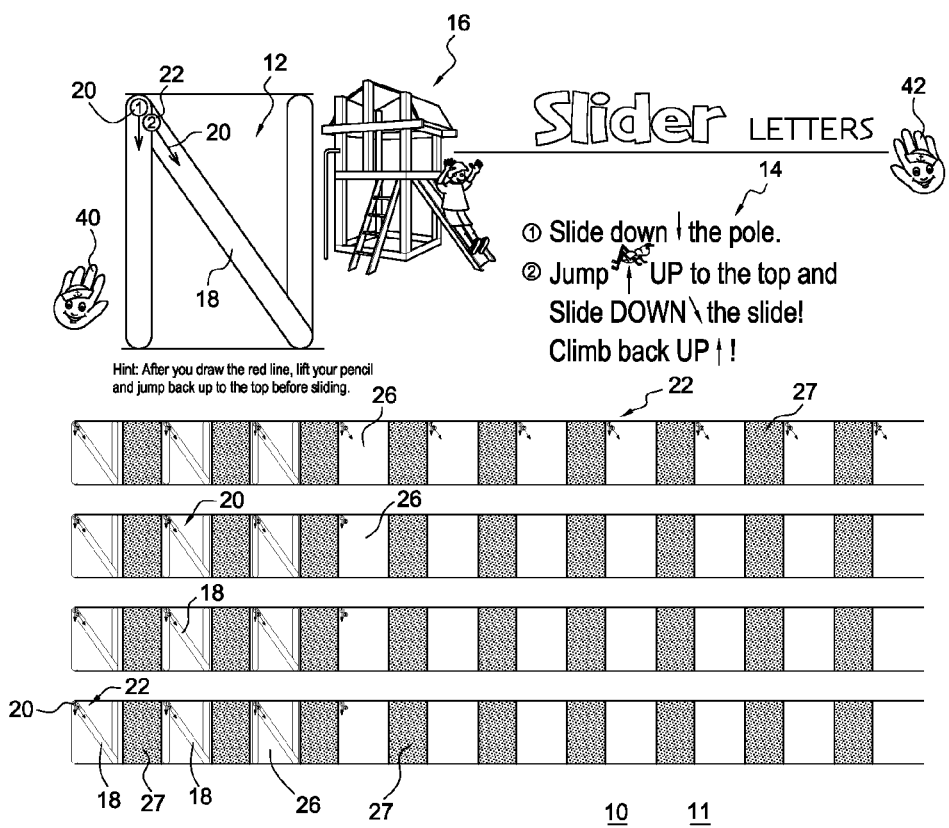
FIG. 5 is an instruction sheet teaching a user how to write the letter "N"

The instruction sheet 10 shown in FIG. 1 may be packaged with, coupled to, or bound with a plurality of additional instruction sheets 10 (i.e. may be bound thereto as part of a pad, notebook or the like). Each bound sheet may have the same basic format but with varying instruction indicia 12, narrative text 14, and pictorial representations 16, etc. to teach writing skills for the different letters or numbers. Sample instruction sheets 10 are shown in FIGS. 1, 2 and 5. For example, the bound assembly may include instruction sheets 10 for all twenty six letters of the English (Latin) alphabet. In this manner, a purchaser of the bound assembly can ensure that the user will learn how to write all the letters of the alphabet. In addition, besides being used to teach how to write upper case letters, the sheets 10 may be used in the manner described herein to teach a user how to write lowercase letters and/or numbers (such as all lowercase letter of the English/Latin alphabet, the numbers 0-9, etc.)

Figure 3:
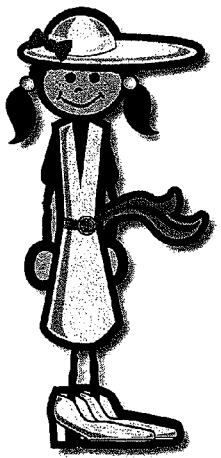
FIG. 3 is a section sheet introducing the letters in a grouping.
Figure 3:
Figure 3:
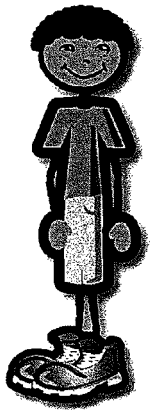
Figure 4:
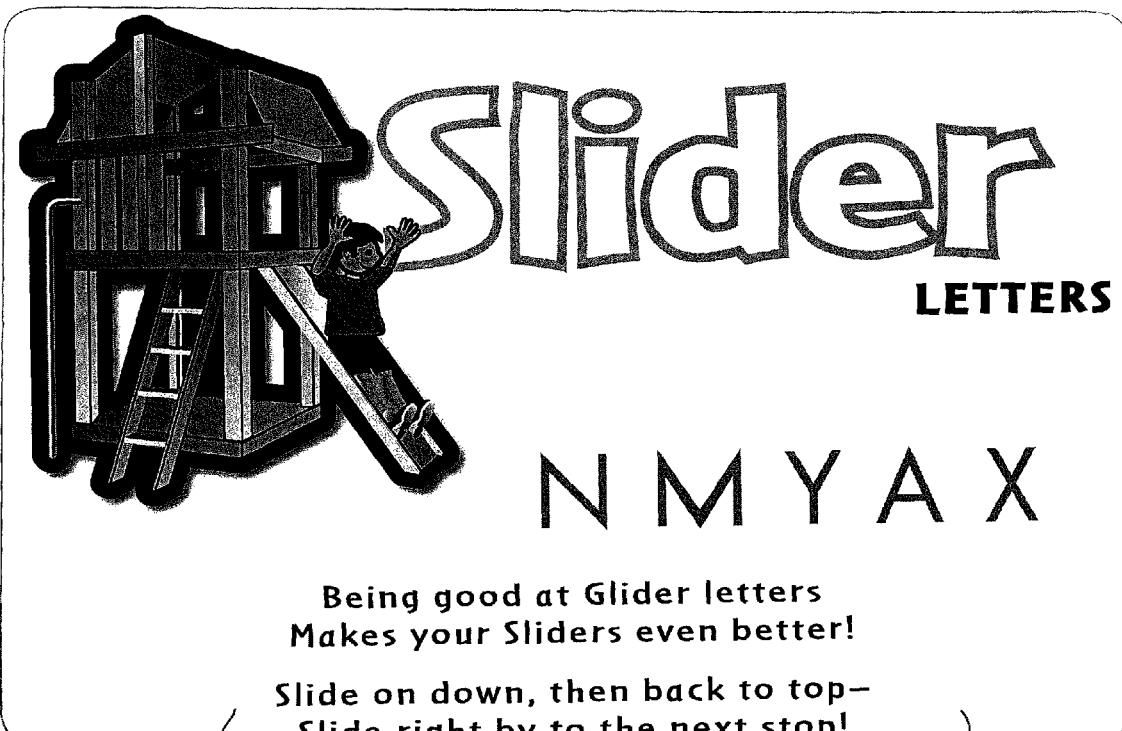
FIG. 4 illustrates a section sheet introducing the letters in another grouping.

The instruction sheets 12/letters may be grouped into groupings having common characteristics or written using similar motor patterns. For example, FIG. 3 illustrates a section sheet 30 which introduces the letters in that grouping (the letters L, F, E and H), which may be termed "stick kid" letters. All of the letters in the stick kid grouping consist exclusively of horizontal and vertical lines, and thus can be taught using similar techniques and are made of similar pre-writing shapes (shown in FIG. 9) or parts thereof. An instruction sheet 10 for each of letters L, F, E and H may be presented in order after the section sheet 30 of FIG. 3. FIG. 4 illustrates a section sheet 30 which introduces the letters in another grouping termed the "slider" letters and includes the letters N, M, Y, A and X. All of the letters in this grouping include angled or oblique lines, and thus can be taught using similar technique and without having to lift the writing instrument off of the paper.

A total of eight groupings may be utilized. The first grouping, as described above, consists of letters (L, F, E and H) made up of vertical and horizontal lines. The second grouping consists of the letters T, I and J. This grouping may be termed the "firefighter" letters and consists of letters made of vertical and horizontal lines, with the addition of a curve for the letter J.

The third grouping consists of the letters D, P and B, and may be termed the "bumping bug" letters. The letters in the third grouping use vertical lines and also incorporate curves more prominently than the second grouping. The fourth grouping consists of the letters C, O, Q, G and S and may be termed the "blast off" letters. The letters in this grouping predominately incorporate curves and also utilize a right oblique shape in the letter Q. The fifth grouping consists of the letter U, and may be termed "unique U." The letter in the fifth grouping is written with a vertical line and curve combined with a change in direction.

The sixth grouping consists of the letters R and K, and may be termed the "karate kickers" group. The letter in this group are written with the three components of vertical lines, curves and diagonals. The seventh grouping consists of the letters V, W and Z, and may be termed the "gliders" letters. The letters in this group are written with horizontal lines and obliques without lifting the writing instrument off of the writing surface. The eighth and final grouping consists of the letters N, M, Y, A and X, may be termed the "sliders" group and is described above. This letters in this group are written using vertical lines, horizontal lines, obliques and adjacent obliques, as seen in the triangle for the letter A. Moreover, in order to properly write the letters in this grouping the writing instrument must be lifted off of the writing surface one or two times.

These letter groupings are based on similar motor patterns and developmental progression of the pre-writing shapes 31 (FIG. 9). In particular, the nine pre-writing shapes 31 shown in FIG. 9 consist of a vertical line, a horizontal line, a circle, a cross (also known more specifically as a horizontal and vertical cross), a right oblique, a square, a left oblique, an "X" (also known more specifically as an oblique cross), and a triangle. These pre-writing shapes 31 can be arranged to create all of the capital letters of the English alphabet (or the Latin alphabet) and therefore are important building blocks for a user to learn for proper capital letter formation. Moreover, the sheets 10 may be arranged, and/or a user may be instructed, to work through each grouping in the order presented above. The groupings may be arranged in this order to present progressively more challenging groupings to a user, and to allow a user to develop basic writing skills before adding more sophisticated writing skills to the skills required by the previous grouping.

Figure 6:
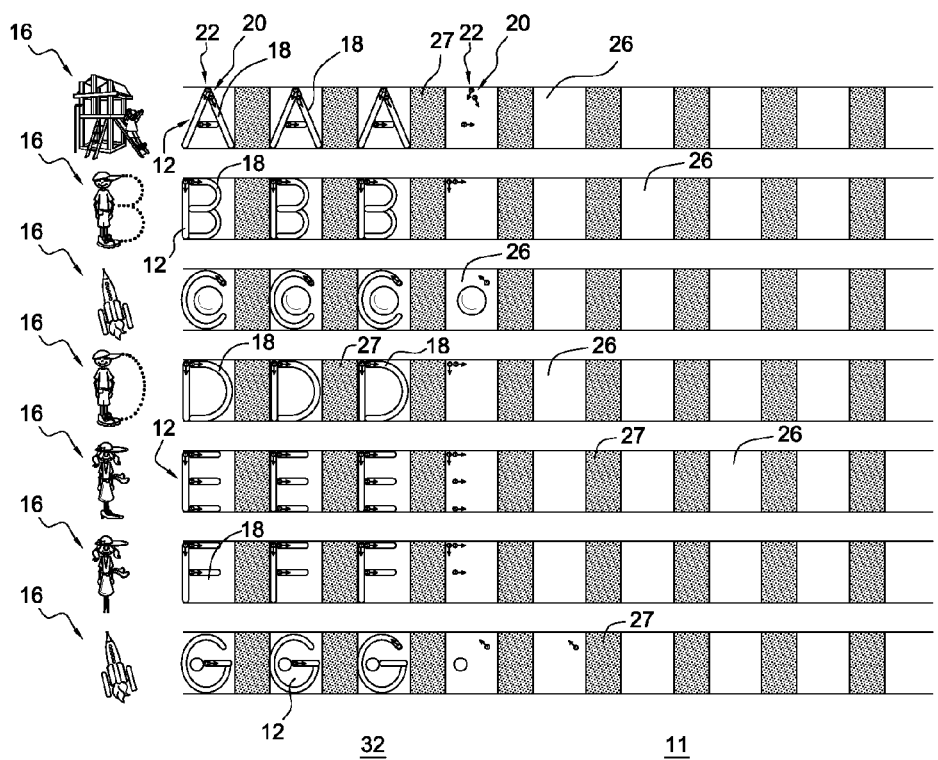
FIG. 6 is a summary sheet teaching a user how to write the letters A through G.

A summary sheet or sheets 32, as shown in FIG. 6, may be provided. The summary sheet 32 may present all of the letters of the instruction sheets 10. Each summary sheet 32 may provide the associated pictorial representation 16 for that letter, along with the associated instruction indicia 12. Each summary sheet(s) 32 may provide blocks/writing spaces 26 and partial instruction indicia 22 in subsequent block 26, along with the blank blocks 26. Thus the summary sheet 32 provides the major cues presented in each instruction sheet 10 and reinforce the lessons of each instruction sheet 10. The summary sheet(s) 32 may be provided at the back of a bound assembly of the instruction sheets 10 to provide an additional tool for repetition and reinforcing the skills learned in each individual instruction sheet. The summary sheets 32 may present the letters in alphabetical order to help a user learn the alphabetical order, since the letter writing may not necessarily be taught in alphabetical order.

Figure 7:
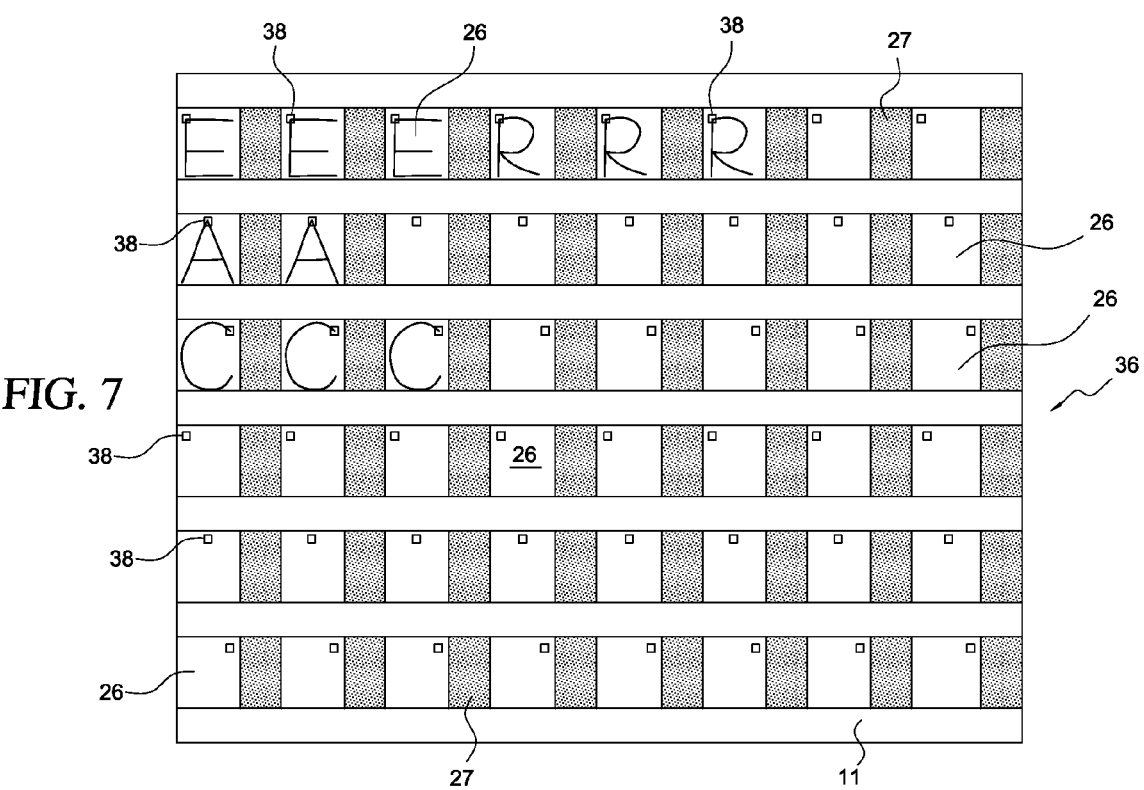
FIG. 7 illustrates another instruction sheet illustrating another embodiment of the invention.
Figure 8:
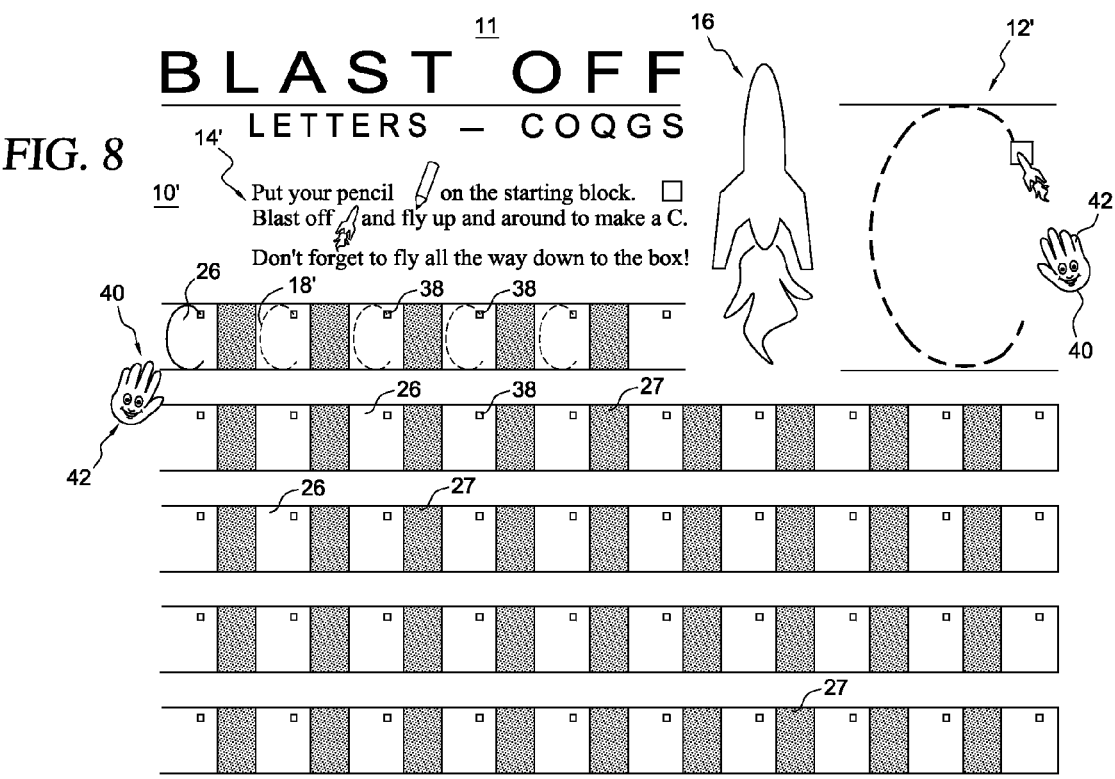
FIG. 8 is yet another instruction sheet illustrating another embodiment of the invention.

As shown in FIG. 7, an instruction sheet 36, which includes a plurality of blocks/writing spaces 26, may be provided. Each block 26 may include a starting cue 38 positioned therein to cue a user to start each letter at the starting cue 38, and can be positioned at a variety of locations (three discrete locations across the top of each block 26 are shown in FIG. 7). Each starting cue 38 is shown as a square dot in the illustrated embodiment, but can take any of a wide variety of shapes and forms. In addition, as shown in FIG. 8, an instruction sheet 10' with the starting cues 38, along with basic instructive indicia 12, narrative text 14, pictorial representation 16 and traceable version 18 may be provided. In this embodiment the instruction indicia 12 and narrative text 14 may lack the cross referencing utilized in the embodiments of FIGS. 1, 2 and 5.

Each instruction sheet 10 may include or carry thereon at least one hand cue 40 upon which a user can place his or her hand to manually stabilize the associated sheet 10 (or sheet 30, 32, 10', etc.) Each hand cue 40 may include or take the form of a visual cue 42. In the illustrated embodiment, the visual cue 42 takes the form of a visual representation (i.e. drawing, design, photograph or the like) of a hand to cue or encourage a user to place his or her hand on the hand cue 40. However, the visual cue 42 can take the form of other indicia besides a hand. For example some other indicia 42 (by way of example, a star, or the letter "H," although nearly any sort of indicia can be used) may be provided on the instruction sheet 10. A user may be taught (i.e. by the instruction sheet 10, associated instructions/packaging, by a teacher, or parent, etc.) that the indicia 42 is to be associated with hand stabilization. In this case, when a user sees the visual cue 42 the user is prompted to stabilize the instruction sheet with his or her non-dominant (i.e. non-writing) hand.

Teachers typically have difficulty ensuring that their students properly stabilize their instruction sheets 10 during use. Accordingly, the hand cues 40 serve as a constant reminder to the user to encourage proper stabilization and use of the instruction sheet 10.

Each hand cue 40 may be positioned at or adjacent to the outer perimeter of the instruction sheet 10 to ensure proper hand placement. In particular, encouraging a user to place his or her stabilization hand at or adjacent to the outer edge of the instruction sheet 10 ensures that maximum stabilization force is exerted while ensuring that the stabilization hand does not interfere with writing operations on the instruction sheet 10. Thus, at least part of each hand cue 40 may be located within about 3 inches of the outer edge of the instruction sheet 10, or within about 10% or 20% of the height or width of the instruction sheet 10 of the outer edge.

The instruction sheet 10 may include a hand cue 40 on both the left and right sides of the instruction sheet 10 (with the "left" and "right" orientation being taken from the perspective of a user reading the instruction sheet 10 as shown in FIG. 1.) The use of two opposed hand cues 40 ensures that a hand cue 40 is sufficiently presented and available for both left-handed and right-handed users. As best shown in FIGS. 3 and 4, both hand cues 40 may be located in the upper half of the instruction sheet 10 since stabilization in the upper half of the sheet 10 is most effective and allows full access to the instruction sheet. Moreover, the hand cue 40 on the left side of the sheet 10 (utilized by right-handed users) may be positioned below the hand cue on the right side of the sheet 10 (utilized by left-handed users). Due to the layout of most sheets, as well as orientation of writing desks, etc. it is desired to place the hand cue 40 for left-handed users higher on the sheet 10 than the other hand cue 40.

The instruction sheet 10 (and other sheets described and shown herein) may be packaged for sale along with a set of instructions that instruct a user (or a user's parents, teachers, etc.) to use the sheets 10 in the manner described herein.

Proper writing habits includes making vertical and diagonal lines from top-to-bottom, making circles from the top, counterclockwise toward the left, and making horizontal lines from left-to-right. Teaching a user to develop these habits prepares a child for proper letter writing. Moreover, learning to follow a visual sequence is important in learning to follow multi-step directions. In addition learning a particular sequence in shape and letter writing can increase legibility and writing fluency (speed and accuracy). Finally, learning to use various lines and curves to construct an object, especially learning to use continuous strokes (rather than unnecessarily lifting the writing instrument) further aides the user in the development of the underlying skills needed for proper letter and number formation. Since the user is cued to the starting point of the letter, it is difficult for a user to reverse the letter orientation. The instruction sheets 10 teach these skills, and also teach the ability to draw within boundaries and the directionality of letter formation.

Having described the invention in detail and by reference to the various embodiments, it should be understood that modifications and variations thereof are possible without departing from the scope of the invention.

What is claimed is:

1. A sheet assembly comprising:
a sheet;
sequential instruction indicia on said sheet, said sequential instruction indicia including discrete ordered steps that cue a user in proper writing strokes to write an associated letter or number;
a pictorial representation of an object or activity on said sheet; and
narrative indicia on said sheet having discrete portions that correspond to said discrete ordered steps of said sequential instruction indicia;
wherein each discrete portion of said narrative indicia describes specific features of said pictorial representation of an object or activity that is symbolic of the associated step of said sequential instruction indicia.

2. The sheet assembly of claim 1 wherein there is a one-to-one correspondence between the discrete ordered steps of the instruction indicia and the discrete portions of the narrative indicia.

3. The sheet assembly of claim 1 wherein said sequential instruction indicia includes directional cues and associated numerical cues.

4. The sheet assembly of claim 3 wherein said sequential instruction indicia includes a traceable version of said letter or number.

5. The sheet assembly of claim 4 wherein said sequential instruction indicia includes directional cues that are positioned on or adjacent to said traceable version of said letter or number.

6. The sheet assembly of claim 5 wherein said traceable version of said letter or number is made of relatively light, shaded or incomplete lines forming the same general shape as said letter or number.

7. The sheet assembly of claim 1 wherein each discrete portion of said narrative indicia is associated by color with a discrete ordered step of said sequential instruction indicia.

8. The sheet assembly of claim 1 wherein said narrative indicia describes or illustrates the creation of a non-letter and non-number object or an activity having a shape or motion generally corresponding to a shape of said letter or number.

9. The sheet assembly of claim 1 further comprising a traceable version of said letter or number on said sheet.

10. The sheet assembly of claim 9 further comprising a partial traceable version of said letter or number printed on said sheet and positioned adjacent to said traceable version.

11. The sheet assembly of claim 1 further comprising a plurality of writing spaces printed thereon upon which said user can write said letter or number, each writing space providing progressively less guidance regarding the writing of said letter or number.

12. The sheet assembly of claim 1 wherein said letter or number is a capital letter of the English alphabet.

13. The sheet assembly of claim 1 wherein each sheet includes a hand cue for cuing a user to place the user's hand thereon to manually stabilize the associated sheet during use.

14. The sheet assembly of claim 13 herein said hand cue includes a representation of a hand.

15. The sheet assembly of claim 1 wherein said narrative indicia includes narrative text.

16. The sheet assembly of claim 1 further comprising a plurality of sheets coupled or bound together, and wherein said plurality of sheets collectively include sequential instruction indicia and associated narrative text instructing a user to write all twenty-six capital letters of the English alphabet.

17. The sheet assembly of claim 16 wherein said plurality of sheets group the twenty-six letters of the English alphabet into groupings having common characteristics, including
a first grouping consisting of the letters L, F, E and H,
a second grouping consisting of the letters T, I and J,
a third grouping consisting of the letters D, P and B,
a fourth grouping consisting of the letters C, O, Q, G and S,
a fifth grouping consisting of the letter U,
a sixth grouping consisting of the letters R and K,
a seventh grouping consisting of the letters V, W and Z, and
an eighth grouping consisting of the letters N, M, Y, A and X.

18. The sheet assembly of claim 1, wherein said pictorial representation comprises at least one of a stick figure extending generally in a vertical direction, and an article of apparel extending generally in a horizontal direction.

19. The sheet assembly of claim 1, wherein said pictorial representation comprises a slide and said associated letter or number is from the group consisting of N, M, Y, A, and X.

20. A method for using a sheet assembly comprising:
accessing a writing surface including sequential instruction indicia thereon, said sequential instruction indicia including discrete ordered steps that cue a user in proper writing strokes to write an associated letter or number, said writing surface further including a pictorial representation of an object or activity on said sheet, said writing surface further including narrative indicia having discrete portions that correspond to said discrete ordered steps of said sequential instruction indicia; and
writing an associated letter or number in the discrete ordered steps,
wherein each discrete portion of said narrative indicia describes specific features of said pictorial representation of said object or activity that is symbolic of the associated step of said sequential instruction indicia.

21. A sheet assembly comprising:
a plurality of bound sheets, each sheet having sequential instruction indicia instructing a user to write a letter thereon,
narrative indicia on said sheet having discrete portions that correspond to discrete ordered steps of said sequential instruction indicia;
wherein said plurality of sheets collectively include sequential instruction indicia instructing a user to write all twenty-six capital letters of the English alphabet,
wherein said plurality of sheets group the letters into groupings having common characteristics, including
a first grouping consisting of the letters L, F, E and H,
a second grouping consisting of the letters T, I and J,
a third grouping consisting of the letters D, P and B,
a fourth grouping consisting of the letters C, O, Q, G and S,
a fifth grouping consisting of the letter U,
a sixth grouping consisting of the letters R and K,
a seventh grouping consisting of the letters V, W and Z, and
an eighth grouping consisting of the letters N, M, Y, A and X;
wherein at least one of said plurality of sheets includes a pictorial representation of an object or activity associated with said sequential instruction indicia for a letter in at least one of said groupings;
wherein each discrete portion of said narrative indicia describes at least one specific feature said pictorial representation of an object or activity that is symbolic of the associated step of said sequential instruction indicia.

* * * * *